Dec. 12, 1933.  R. G. WULFF  1,938,991
METHOD OF SEPARATING ACETYLENE FROM GASEOUS MIXTURES
Filed Aug. 22, 1928
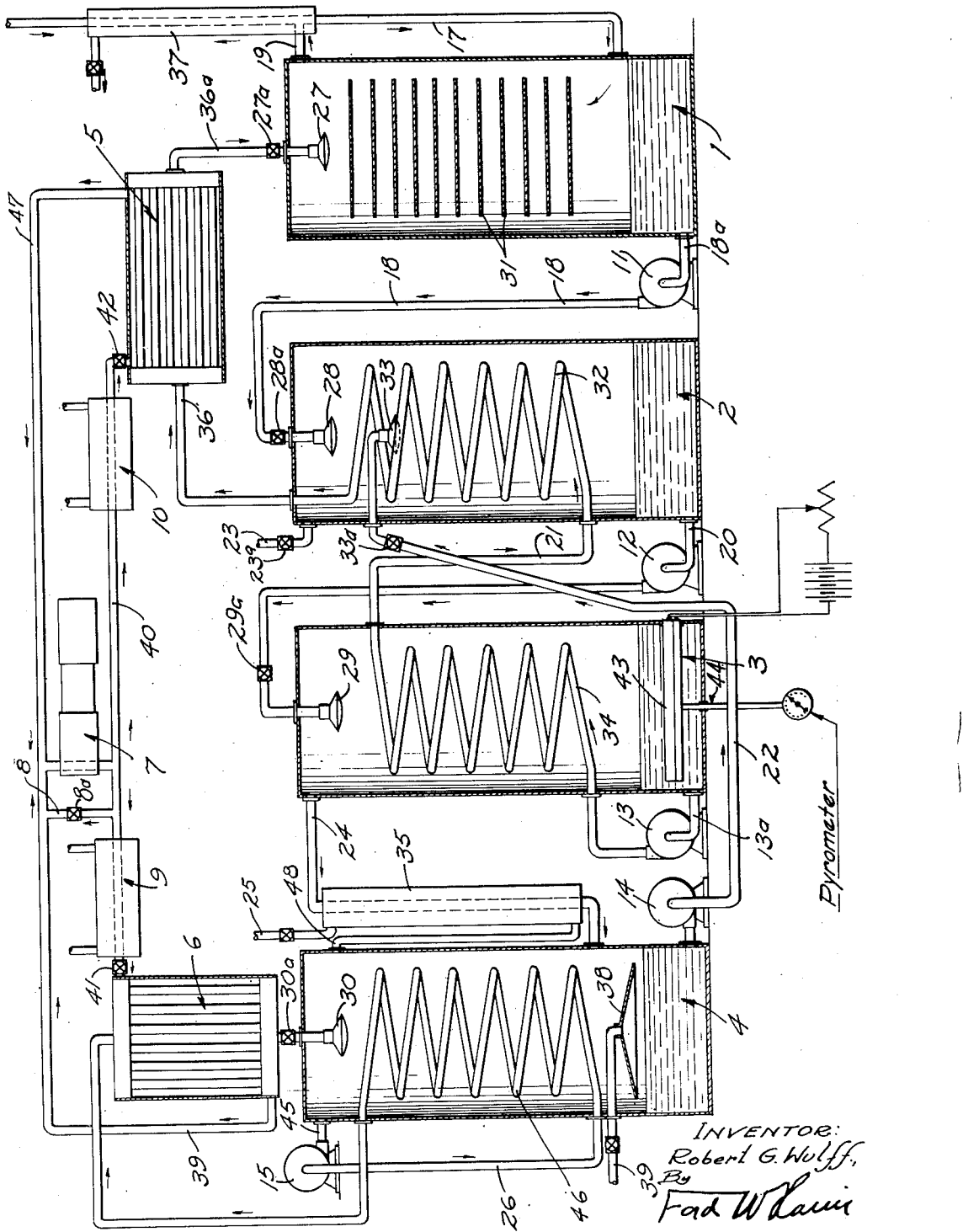
INVENTOR:
Robert G. Wulff,
By
Fad W Lawin
ATTORNEY.

Patented Dec. 12, 1933

1,938,991

UNITED STATES PATENT OFFICE 1,938,991

METHOD OF SEPARATING ACETYLENE FROM GASEOUS MIXTURES

Robert G. Wulff, Los Angeles, Calif.

Application August 22, 1928. Serial No. 301,402

6 Claims. (Cl. 260—170)

This invention relates to a method and apparatus for separating acetylene from gaseous mixtures containing it. More particularly, the invention relates to the separation of acetylene from a gas which also contains ethylene. Such a gas is the product of my process of making acetylene from other hydrocarbons. This process is described in my co-pending application Serial No. 281,406, filed May 29, 1928. The invention of the present application is not limited to the extraction of acetylene from ethylene containing mixtures, but may also be used to extract acetylene from a wide variety of gas mixtures, especially where there is a content of nitrogen, hydrogen, carbon monoxide, ethylene, or methane, or of any of these in admixture.

Some of the advantages of the invention are the completeness of separation obtained, the ease of handling and the purity of products obtained. Another advantage is the avoidance of the use of high pressures which would be expensive where there is a small content of acetylene. Other advantages will be apparent to those skilled in the art.

The accompanying drawing is a diagrammatic representation of my apparatus in side elevation.

Numeral 1 represents a gas washing or scrubbing column provided interiorly with baffle plates or tower packing 31. A spray head 27 extends into the column from the top. Pipes 17 and 19 enter it from one side. The latter pipe extends to a jacket 37 surrounding the pipe 17. A pipe 18ª, in which there is a pump 11, connects to the opposite side of the column near its bottom.

2 is a column in general similar to column 1, except that it is provided with interior coils 32 in place of baffles, and two spray heads 28 and 33. The interior of the column is in communication with the atmosphere through a pipe 23, when the valve 23ª is open. From the base of the column a pipe 20, in which there is a pump 12, serves for the transfer of liquid to a spray head 29 in the top of column 3. A pipe 21 connects a coil 34 in column 3 with a coil 32 in column 2. Likewise, a pipe 22 connects the base of the column 4 with the spray head 33 in column 2. A pipe 18 also connects the base of column 1 with the spray head 28 of column 2.

Column 3 is nearly identical in construction with column 2, but has only one spray head. A pipe 24 leads from the upper interior portion of column 3 downward through a jacket 35 into the side wall of column 4, near the base of the same. Near the bottom of column 3 there is a pipe 13ª, in which there is a pump 13, adapted to transfer liquid from the base of the column into the coil 34 and thence by means of the pipe 21 to the coil 32; then through a pipe 36 to a heat exchanger 5; thence through the pipe 36ª to the spray head 27 in column 1. An electric heater 43, with a thermo-couple 44, is provided under column 3 to heat the base thereof, and control its temperature.

In column 4 there is a spray head 30 within the top of the column. The head communicates with one end of a heat exchanger 6, the other end of the exchanger being in communication with the coil 46, within the column. A pump or compressor 15 is adapted to draw vapor from the top of the column interior and transfer it through the coil 46 to the heat exchanger 6. An outside pipe 26 connects the pump and the lower part of the coil. In the lower part of the column, but at some distance from the base, a hood 38 extends horizontally. A pipe 39 leads from the topmost point of the hood to a destination outside of the column, which may be a plant for charging acetylene into cylinders. The spray heads 27, 28, 29, 30 and 33 are controlled by valves 27ª, 28ª, 29ª, 30ª and 33ª respectively.

The spaces surrounding the tubes of the heat exchangers 5 and 6 are connected through the pipes 47 and 40. Two control valves, 41 and 42, are provided in the pipe 40 and are located near each heat exchanger respectively. Connecting the pipes 39 and 40 is a by-pass pipe 8, in which there is a by-pass valve 8ª. A compressor capable of handling a refrigerant giving low temperatures, such as nitrous oxide, is indicated at 7 and is connected between the pipes 47 and 40. At 9 and 10 are indicated coolers for the compressed refrigerant. They are cooling water jackets. The entire system described is operated at a pressure approximating two atmospheres absolute. In the compressors and expansion chambers, other pressures will of course prevail.

The operation of the above described apparatus and of my process is as follows:

The gas to be separated is supplied to the system through the pipe 17 at a pressure preferably of about two atmospheres absolute. The composition of this gas which will be assumed for the sake of illustrating a concrete example, is:

| Acetylene | Ethylene | Methane | Hydrogen |
|---|---|---|---|
| 6% | 6% | 44% | 44% |

Any $CO_2$ and water vapor have been previously removed, as well as gasoline and oil vapors, by any appropriate means. The gas is first cooled to about −77° C. in a heat exchanger indicated by the jacket 37. It then enters column 1 through the pipe 17 and passes upward through the baffle plates or packing 31, and meets a stream of liquid hydrocarbon sprayed from the spray head 27. The liquid should be a petroleum fraction boiling at ordinary pressures at from 50° C. to 85° C. and should consist very largely of hexane or hexanes and should be, on entering, at a temperature of about −80° C. It will absorb the acetylene and ethylene, and some methane and carry these gases in solution to the bottom of the column. The residual cold hydrogen and methane will expand through the pipe 19 and the jacket 37, thus cooling the incoming gas. These waste gases, or a part of them, may be burned under column 3 to maintain the temperature there desired, thus being a substitute for the electrical heater shown in the drawing.

The pump 11 is continuously operated to move the liquid accumulated in the bottom of column 1 and to spray it through the spray head 28, in column 2. It thereupon falls over the coil 32, cooling the contents thereof. The hexane will in this operation become warmed considerably, so that it will no longer be able to hold the methane dissolved in it. Column 2 should be so operated that the temperature of the liquid accumulated at the base will be close to −12° C. The total methane content of the hexane, and some gaseous ethylene will be discharged through the pipe 23. The spray head 33 discharges a stream of liquid acetylene mixed with a little hexane, derived from column 4.

The pump 12 transfers the liquid hexane, still containing all the dissolved acetylene and nearly all the ethylene, from the base of column 2 to the spray head 29 in column 3. In falling over the coil 34, it is warmed further, while at the base of the column 3, the liquid is maintained at a temperature of about 87° C. by the heater 43. This is the temperature at which pure hexane exhibits a pressure of two atmospheres absolute, the preferred pressure of operation of the column. The acetylene and ethylene have, however, been boiled off and pass through the pipe 24 at the top of column 3, through the jacket 35, in which they are cooled, to the lower part of column 4. A temperature of −70° C. should be maintained at the bottom of said column.

The residual liquid hexane in column 3 is pumped through the pipe 13ª and the coil 34 by the pump 13, and passes through the coil 32 in column 2 to the heat exchanger 5, where it is cooled by refrigeration to approximately −80° C. It is then ready to again be used as a spray liquid in the first column. It is seen that the hexane being sprayed from the spray head 28 of column 2 is everywhere heat-interchanged with the warmer hexane returning from the base of column 3. For this cycle, to be operative, it is necessary for the lowest temperature to be maintained by a refrigerator, and for the highest temperature to be maintained by heat applied, both as described. The energy input in the form of refrigeration in the heat exchanger 5 is that fundamentally required to perform the extraction accomplished by the cycle, plus the heat losses and the lack of perfect efficiency.

The frigerating system necessary to an installation of this kind compresses nitrous oxide, or other low temperature refrigerant such as a suitable sharp fraction of saturated paraffin hydrocarbons, in the compressor 7. The compressed refrigerant is cooled to room temperature by the cooler 10, and then, controlled by the valve 42, is allowed to expand in the chamber surrounding the tubes of the heat exchanger 5. Said evaporated refrigerant is then drawn from said chamber by the inlet end of the compressor 7, and the cycle is repeated. The by-pass valve 8ª is operated in conjunction with the valves 41 and 42 so as to adjust the needs of the process to the capacity of the compressor.

Refrigeration is similarly applied to the heat exchanger 6 as may be necessary to make column 4 operative. The coolers 9 and 10 of the refrigeration system remove the heat of the refrigerant acquired from the removal of heat from the heat exchangers 5 and 6, plus the fundamental energy required to make such rejection of heat at room temperature, plus the inefficiency of the cycle, plus the heat losses of the same.

Column 4 receives the gaseous mixture of acetylene and ethylene, and with a trace of hexane vapor, near the bottom thereof and at a temperature of about −70° C. This gas courses upward and meets a stream or spray of nearly pure liquid ethylene at the top of said column. The temperature of said spray is about −92° C. as it issues from the spray head 30. The upward coming gas is then cooled, and in the process, the acetylene is absorbed or dissolved into said liquid ethylene. Also, as the liquid runs down the column, it is warmed and the ethylene by preference evaporated from it. Liquid acetylene thus accumulates in the bottom of the column, while there is relatively pure ethylene vapor and liquid at the top. The pump 15 draws in some of the gas from the top of the column and forces it through the pipe 26 and the coil 46, compressing it at the same time. The downcoming spray of liquid ethylene cools said gas and causes its partial liquefaction within the coil 46. This exchange of heat also serves to assist the evaporation of the ethylene from the spray. Said partially liquefied gas within the coil 46 then enters the heat exchanger 6 where the liquefaction is completed and the liquid also cooled to the desired temperature of −92° C. Said liquid then sprays through the spray head 30.

The liquefaction of a gas such as that within the top of column 4 yields a liquid, of course, which has the same weight percentage composition as the gas forming it. But this liquid then starts to evaporate by preference the most volatile constituent, which in this case is the ethylene, so that it tends to form gas at the top of the column richer in ethylene than that being drawn in by the compressor or pump 15 for liquefaction. This action is cumulative, the pump 15 then drawing purer and purer ethylene, till the gas at the top of the column is maintained at the purity desired. Then under continuous operation ethylene is drawn off through the port 48, the jacket 35 and the pipe 25 as a finished by-product, at the same rate as it initially enters column 4. On the way out it serves to help cool the incoming gas mixture from column 3, in the heat exchanger indicated by the numeral 35. The amount of circulation of ethylene at the top of the column 4 is maintained in such proportion to the rate of formation of ethylene or the rate at which gas enters column 4 to be purified, as to yield continuously ethylene of the purity desired, and at the rate of its extraction from the gas mixture.

At the top of the column the temperature of the liquid ethylene is held at a temperature of −92° C., the temperature at which pure ethylene has a vapor pressure of two atmospheres absolute, the preferred pressure of operation of the column. At the same time, the liquid acetylene accumulated at the bottom of the column is held at a temperature of −70° C., the temperature at which pure liquid acetylene has also a vapor pressure of two atmospheres absolute. Thus there is maintained over the liquid acetylene a vapor of pure acetylene gas, and makes it possible for the hood 38 and associated suction means to draw off pure acetylene gas, through the pipe 39. Said gaseous acetylene is the finished product and may be heat-interchanged with the incoming gas mixture from column 3, so as to more nearly balance the heat effects. This heat exchange would be accomplished in a modified form of the heat exchanger indicated at 35, wherein there would be no contamination of the pure acetylene or ethylene and no loss of either. Said pure acetylene gas making exit through the pipe 39 is then conveyed to storage or to some point of use.

In column 3 where the acetylene and ethylene are released from solution in the hexane, it was said that said gas mixture leaving column 3 for treatment in column 4, contains a little hexane. Said hexane, due to the much lower temperature in column 4, is in the liquid state therein and therefore accumulates in solution in the liquid acetylene at the bottom of said column. It is necessary to provide for the continuous removal of said hexane, so that the process will be steady in operation. This is accomplished by a circulation system in which the pump 14 withdraws liquid acetylene, forcing it through the pipe 22 and spraying it from the spray head 33 in column 2. Since the temperatures and pressures in column 4 are too low to make possible the existence of hexane in the vapor state to any appreciable extent, it therefore returns to column 2 as described and is not lost from column 4 in the form of contaminant vapor in the ethylene or acetylene as drawn off from said column, except in negligibly small amount.

Another way to explain that this return of hexane is operative is to say that the the proportion of hexane to acetylene that may exist in the liquid at the bottom of column 4 is substantially larger than that which exists in the gas at the top of column 3, and that since this return system is also returning considerable acetylene to column 2 for repeated treatment, this comparison of proportions just mentioned is favorably magnified.

It was said that the temperature of the liquid at the bottom of column 4 is to be −70° C., the temperature at which pure acetylene shows a vapor pressure of two atmospheres absolute. Since, however, this liquid acetylene has some liquid hexane always dissolved in it, which lowers the vapor pressure at any one temperature, then the actual temperature will be a little higher, depending on the percentage of hexane content of said liquid. This temperature will be as much higher as is necessary to correct the acetylene vapor pressure of said liquid to two atmospheres absolute, the preferred pressure of operation of the column.

It is to be understood that column 4 is the only column which requires to be operated at a pressure substantially higher than atmospheric. This is due to the fact that liquid acetylene when cooled in attempting to reduce its vapor pressure to one atmosphere absolute, solidifies by the time its pressure has been reduced to one and a quarter atmospheres. Solid acetylene would be undesirable on account of the difficulty of handling it in a column. In actual operation of column 4, however, the acetylene at the bottom thereof is diluted to some extent with liquid hexane, which lessens the tendency to solidify, and permits operation at lower temperatures and at lower pressures than with the pure liquid acetylene.

The presence of the liquid hexane as a diluent of the liquid acetylene at the bottom of column 4 is therefore desirable in preventing or lessening the possibility of formation of solid acetylene. It is desirable also as a factor tending to reduce the possibility of explosion of the liquid acetylene, as it is known to the art that liquid acetylene in the pure state under some conditions may spontaneously decompose with great violence. In providing for the dilution of the liquid acetylene in the column, I do so with the full knowledge that it is a method generally applicable of preventing the explosion of liquid acetylene and that such a mixture is a salable potentially commercial article.

For the sake of security then, it is desirable to operate column 4 at about two atmospheres absolute, and I prefer to do so. The other three columns may be operated at higher or lower pressures than this, and column 4 may be operated at higher pressures. I prefer to operate all columns at two atmospheres.

It is understood that in the treatment of a gas mixture of composition different from that assumed for example, the temperatures would be different from those given here, the quantity of hexane in proportion to said gas would be altered, as would the quantity of circulation in the several cycles of the process, as well as the amount of refrigeration. So would all these conditions be altered for production of acetylene or ethylene of different purities, or when operating at column pressures different from two atmospheres absolute, all without departing from my invention. The necessary alteration would be within the skill of expert chemical engineers to determine.

It has been brought out that hexane operates as a solvent for the removal of acetylene and ethylene from a gas mixture according to my process. It is suitable because of its very low temperature of solidification, and its cheapness. An appreciable amount of it is lost in the form of vapor contaminating the extracted or stripped gas of the first column, and must be regularly replenished. This amount of loss, though of considerable volume, is negligible from the standpoint of cost when compared to the value of the products formed, acetylene and ethylene. The use of hexane is advantageous also because as a contaminant of the stripped gas, it does no more than to enrich said stripped gas as to fuel value, and will not detract from its use as a fuel gas for whatever industrial application.

Besides normal hexane or its isomers, hydrocarbons of the naphthene series may also be used as solvents, as well as acetone, acetaldehyde, ethyl alcohol, or others, high solubility of acetylene or ethylene therein not being necessary. For instance, acetylene and ethylene are not very soluble in hexane—the reason that the process is operative being the use of low temperatures. It will also be apparent to any one skilled in the art what the relative advantages of the different possible solvents will be, and that the actual conditions of operation will be different according to the solvent used. Certain solvents may also be used in admixture, such as hexane or hexanes mixed with naphthenes and even including some heptanes or pentanes.

I claim as my invention:

1. A process of separating acetylene and ethylene separately in pure condition from a gaseous mixture containing them and hydrogen and methane, which comprises cooling the gaseous mixture to a temperature of approximately −80° C., washing it with hexane at approximately said temperature to dissolve the acetylene, ethylene and a small portion of the methane, removing the charged hexane and heating it to discharge all traces of methane from said hexane, removing said methane, further heating said charged hexane to approximately 87° C. to discharge the acetylene and ethylene dissolved in said hexane together with a small portion of said hexane itself, removing said discharged fluids and cooling them to approximately −70° C., fractionating said acetylene and ethylene, liquefying most of the hexane vapor together with a portion of said acetylene, maintaining a body of this liquid, and withdrawing gaseous acetylene from the top of said liquid.

2. A process of separating acetylene and ethylene separately in pure condition from a gaseous mixture containing them and hydrogen and methane, which comprises cooling the gaseous mixture to a temperature of approximately −80° C., washing it with hexane at approximately said temperature to dissolve the acetylene, ethylene and a small portion of the methane, removing the charged hexane and heating it to discharge all traces of methane from said hexane, removing said methane, further heating said charged hexane to approximately 87° C. to discharge the acetylene and ethylene dissolved in said hexane together with a small portion of said hexane itself, removing said discharged fluids and cooling them to approximately −70° C., fractionating said acetylene and ethylene, liquefying most of the hexane vapor together with a portion of said acetylene, maintaining a body of this liquid, and returning a portion of said liquid to the place of separation of the methane from said charged hexane.

3. A process of separating acetylene and ethylene separately in pure condition from a gaseous mixture containing them which comprises cooling the gaseous mixture to a temperature of approximately −80° C., washing it with hexane at approximately that temperature, removing the charged hexane and heating it to a temperature of approximately −12° C. to discharge all traces of slightly soluble contaminant gases from said gaseous mixture, removing said contaminant gases heating the charged hexane to 87° C. to discharge the acetylene and ethylene dissolved in said hexane together with a minor portion of the hexane itself, removing said gaseous mixture of acetylene, ethylene, and said hexane vapor, cooling them to about −70° C., fractionating the acetylene and ethylene, liquefying most of the hexane vapor together with a portion of the acetylene, maintaining a body of this liquid, and returning its accumulation to the place of separation of the slightly soluble contaminant gases from the charged solution.

4. A process of separating acetylene and ethylene separately in pure condition from a gaseous mixture containing them which comprises cooling the gaseous mixture to a temperature of approximately −80° C., washing it with hexane at approximately that temperature, removing the charged hexane and heating it to a temperature of approximately −12° C. to discharge all traces of slightly soluble contaminant gases from said gaseous mixture, removing said contaminant gases, heating the charged hexane to 87° C. to discharge the acetylene and ethylene dissolved in said hexane together with a minor portion of the hexane itself, removing said gaseous mixture of acetylene, ethylene, and said hexane vapor, cooling them to about −70° C., fractionating the acetylene and ethylene, liquefying most of the hexane vapor together with a portion of the acetylene, maintaining a body of this liquid, and withdrawing gaseous acetylene from the top of said liquid.

5. A process of separating acetylene from a gaseous mixture containing it, ethylene, hydrogen, and methane which comprises cooling the gaseous mixture to a temperature of approximately −80° C., washing it with hexane at approximately that temperature to dissolve the acetylene, ethylene, and a small amount of methane, removing the charged hexane and heating it to discharge the methane, removing said methane, further heating said charged hexane to approximately 87° C. to discharge the acetylene, ethylene, and a small amount of said hexane, removing said discharged vapors and cooling them to approximately −70° C., fractionating said acetylene and ethylene, liquefying the hexane vapor together with most of the acetylene, maintaining a body of said liquid, and withdrawing gaseous acetylene from the top of said liquid.

6. A process of separating acetylene from a gaseous mixture containing it, ethylene, methane, and hydrogen, which comprises cooling the mixture to a low temperature and washing it with cold hexane, removing the charged hexane, allowing the hexane to become sufficiently warm to release the methane but not the acetylene and ethylene, removing the methane, heating the hexane to vaporize the acetylene, ethylene and a portion of the hexane itself, removing said vaporized mixture and cooling it to a cold temperature in order to liquefy the acetylene and the hexane, and removing the acetylene in gaseous form from a plane above the liquid.

ROBERT G. WULFF.